Sept. 4, 1951  F. R. BELLUCHE  2,567,049
LINE-UP MACHINE

Filed Jan. 31, 1945  10 Sheets-Sheet 1

Inventor
Frank R. Belluche

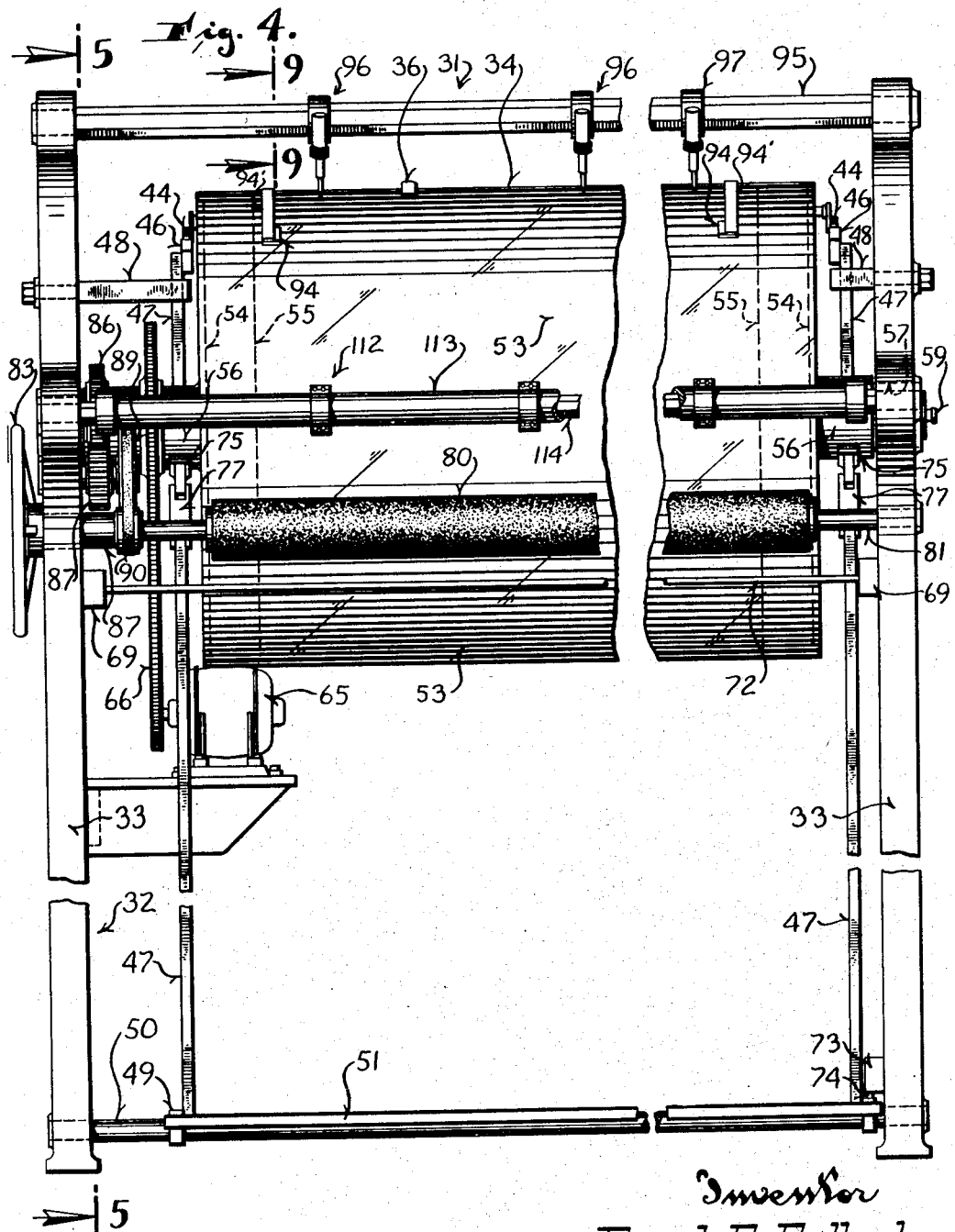

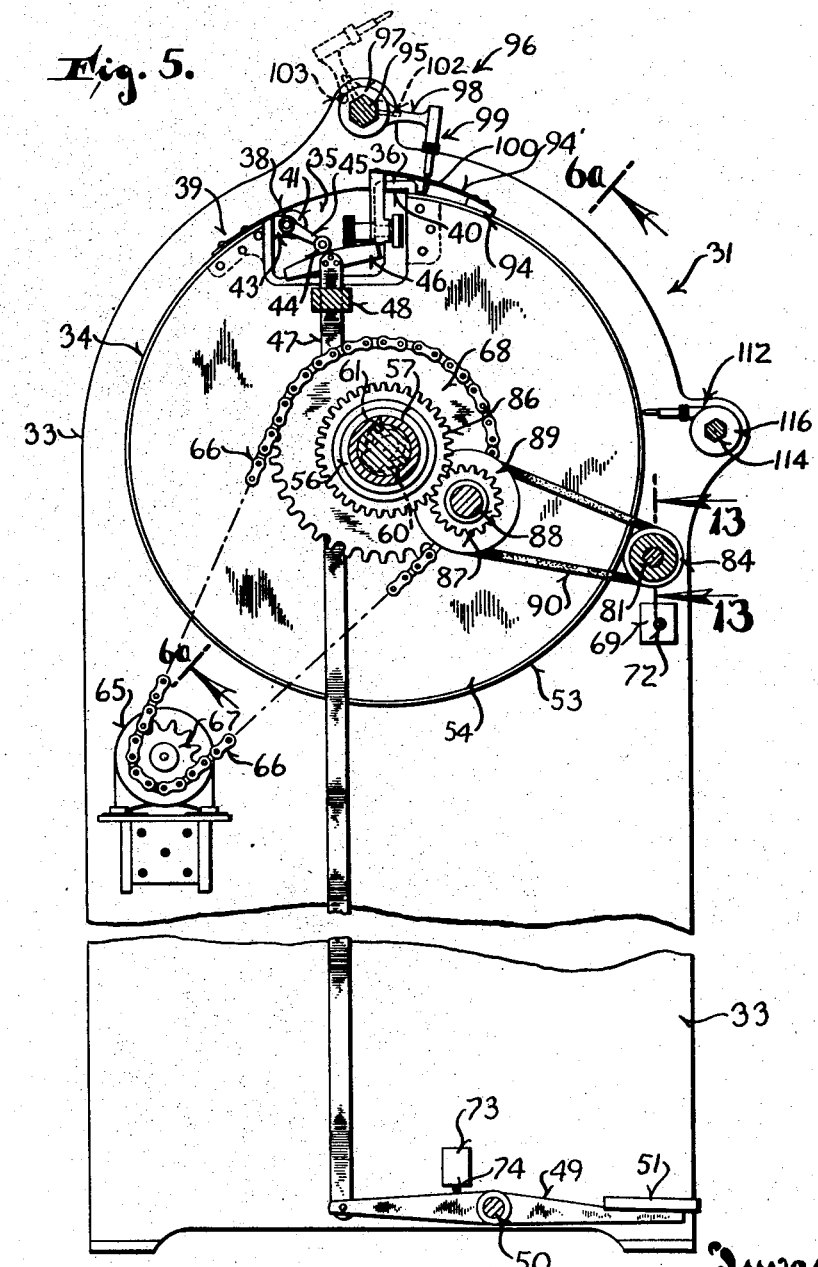

Sept. 4, 1951  F. R. BELLUCHE  2,567,049
LINE-UP MACHINE
Filed Jan. 31, 1945  10 Sheets—Sheet 4
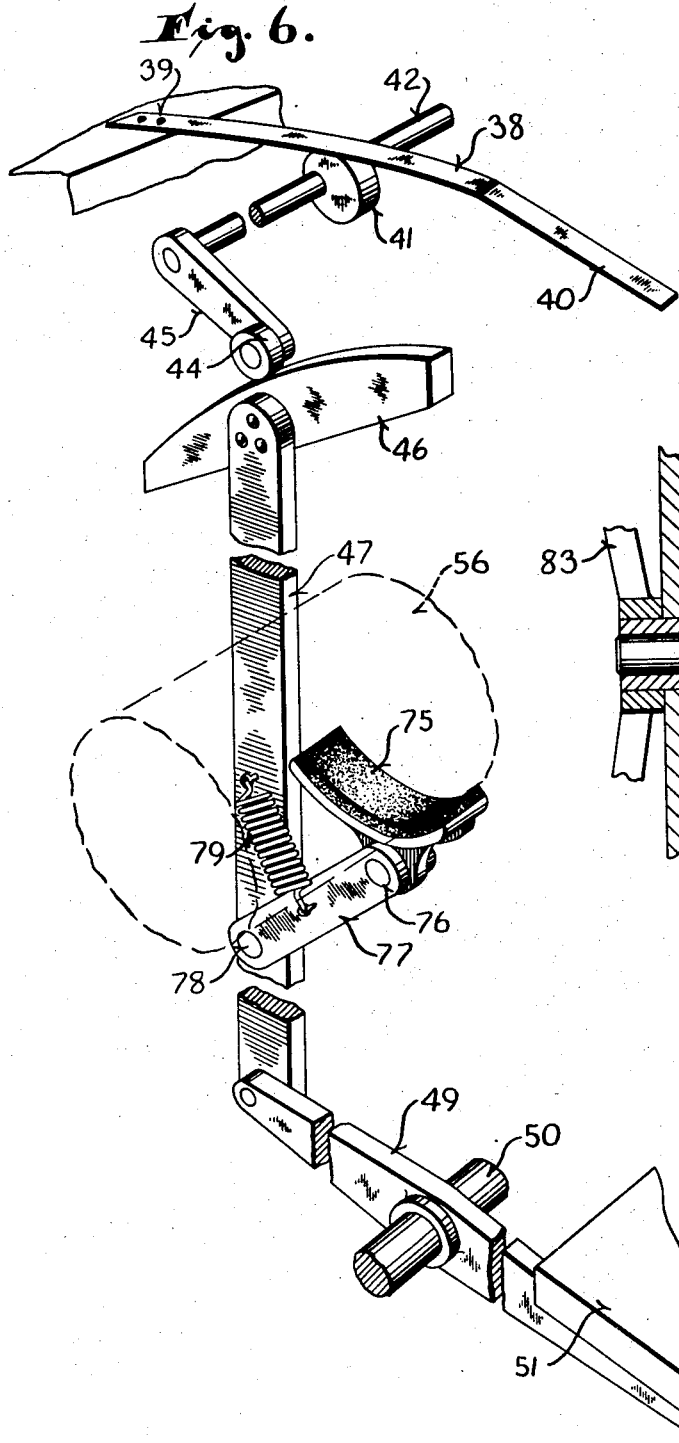
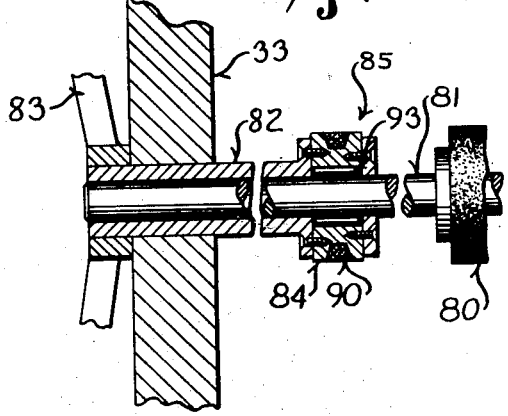
Inventor
Frank R. Belluche

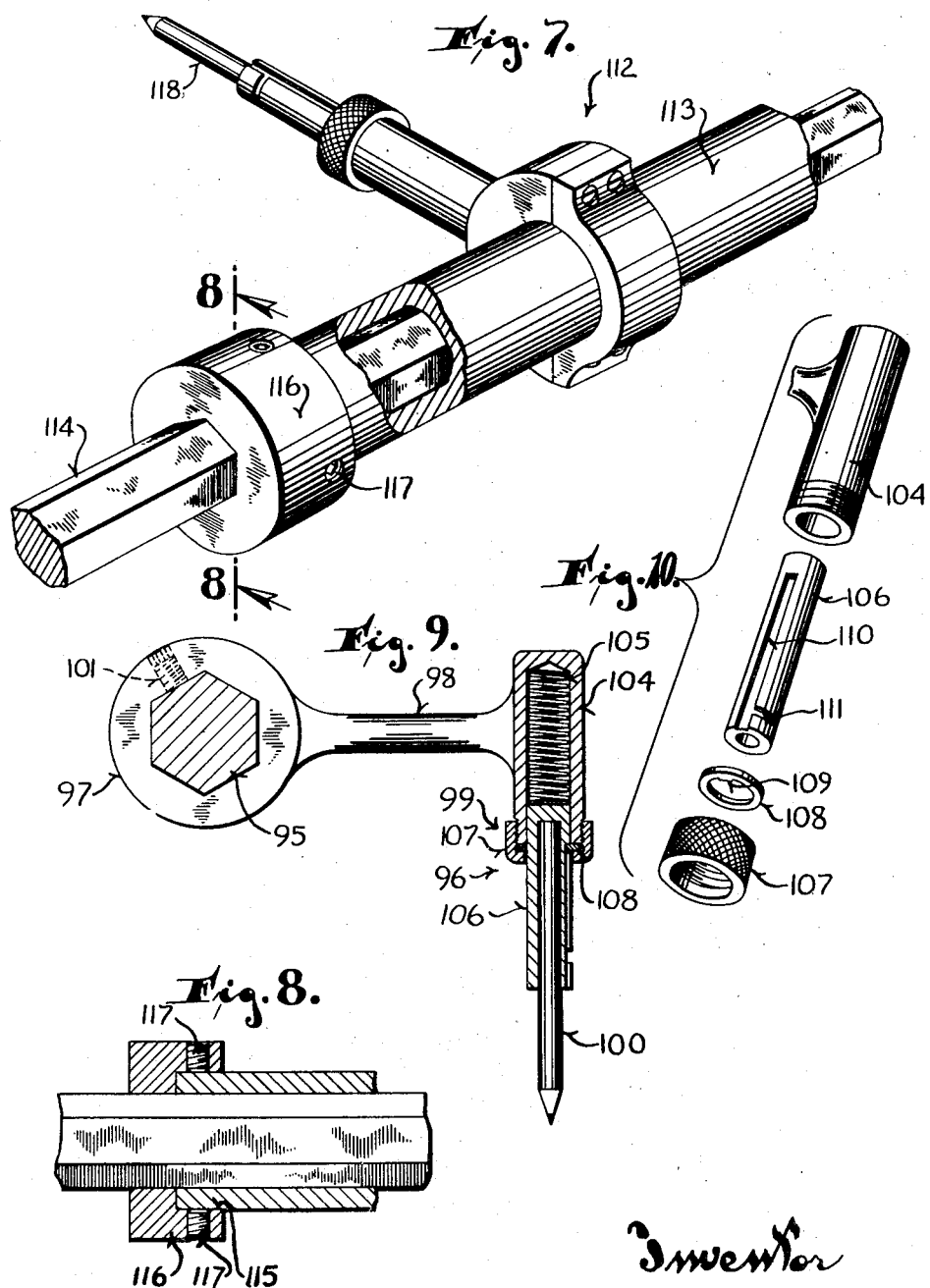

Sept. 4, 1951 F. R. BELLUCHE 2,567,049
LINE-UP MACHINE
Filed Jan. 31, 1945 10 Sheets-Sheet 7
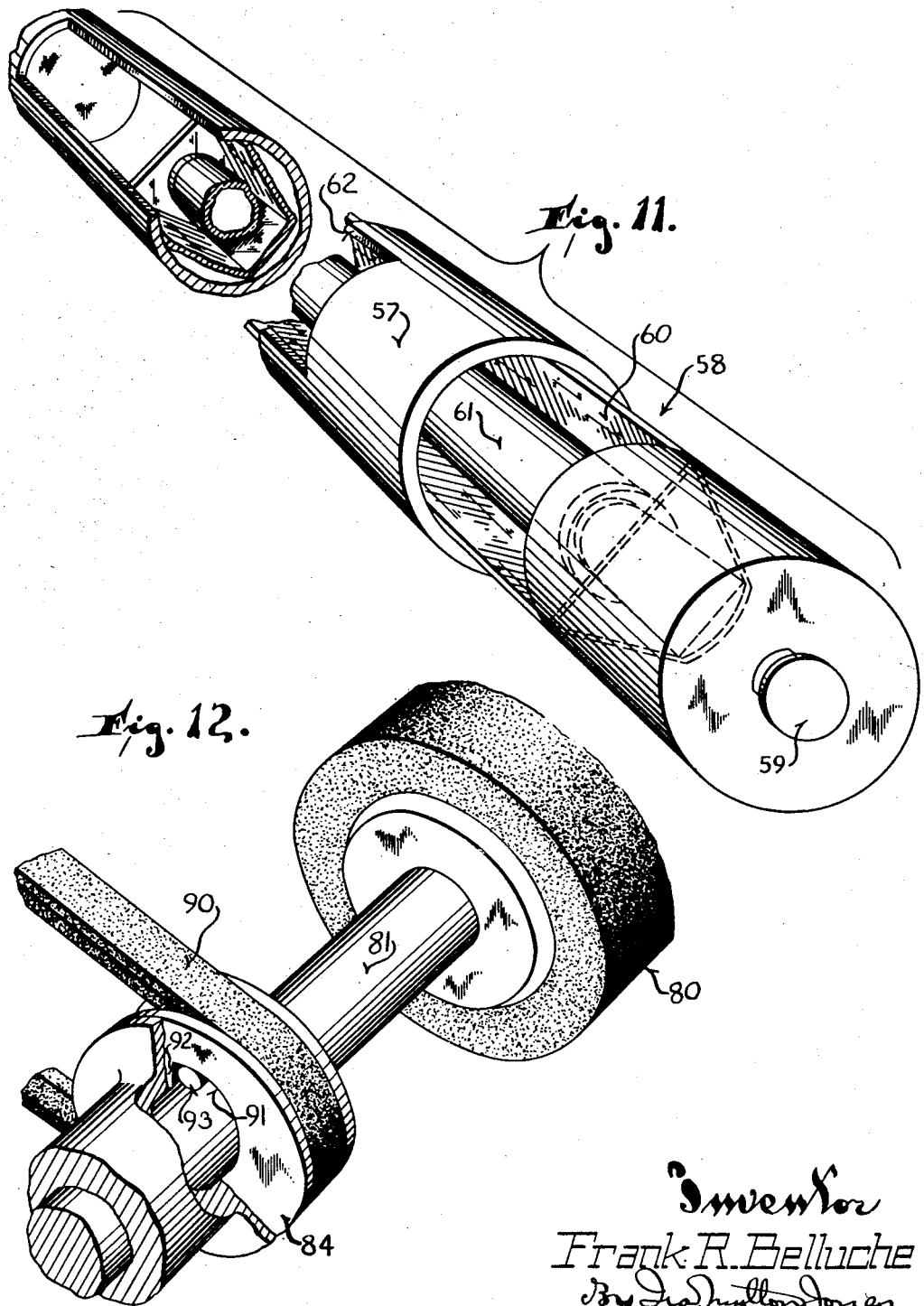

Inventor
Frank R. Belluche

Sept. 4, 1951  F. R. BELLUCHE  2,567,049
LINE-UP MACHINE
Filed Jan. 31, 1945  10 Sheets-Sheet 9

Inventor
Frank R Belluche
Attorney

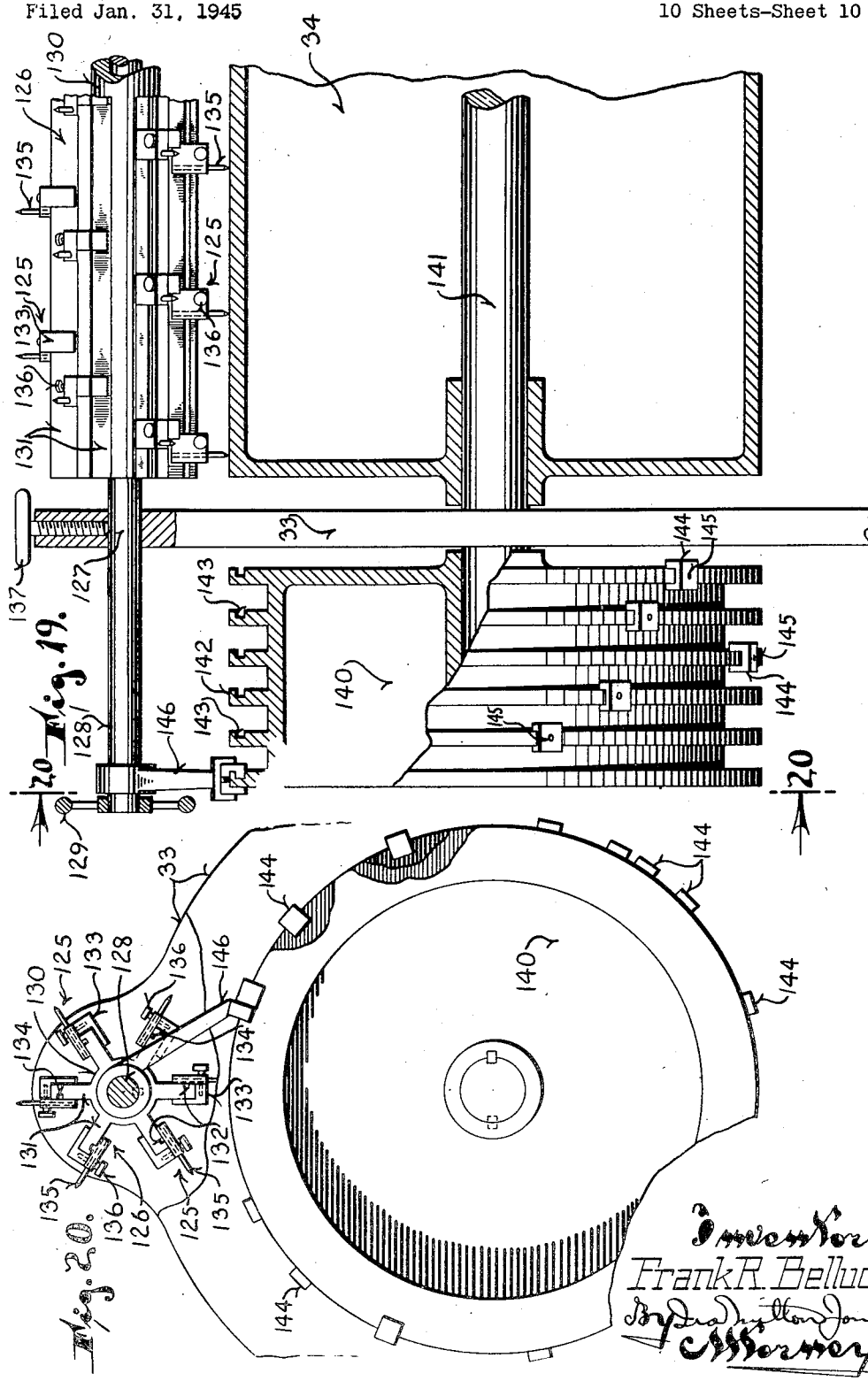

Patented Sept. 4, 1951

2,567,049

UNITED STATES PATENT OFFICE 2,567,049

LINE-UP MACHINE

Frank R. Belluche, Racine, Wis., assignor to The Christensen Machine Company, Racine, Wis., a corporation of Wisconsin Application January 31, 1945, Serial No. 575,399

11 Claims. (Cl. 33—21)

This invention relates to the art of printing and has particular reference to the practice of checking the alignment of printed matter on one or both sides of relatively large printed sheets.

In the printing of magazines, books and the like, many pages of these small size publications are printed on one sheet of paper with print on both sides of the sheet so as to form leaves. Naturally, one of the objects in printing such material is to secure alignment of the printed matter for different pages on one side of the sheet and to also obtain alignment of such print with the printed matter on the opposite side of the sheet.

During the "make ready" period immediately prior to printing, the printer locks all of the plates together on the cylinder or bed with the type in as near to alignment as possible by individually adjusting the plates on the cylinder or bed.

One or more sample sheets are then printed and it has been the custom in the past to lay such a sample sheet with printing on one or both sides thereof on a flat glass-topped table having lights beneath its top to enable checking of the alignment of printed matter on each side of the sheet and to enable determination of the degree of registry between printed matter on opposite sides of the leaves on the sheet.

This is usually effected by means of a large T square or other straight edge which the printer uses as a guide in the drawing of spaced parallel transverse comparison lines on the sheet in line with the first and last lines of each printed page, and for the delineation of a series of spaced parallel longitudinal lines perpendicular to the lines of print and drawn along their ends. These guide lines delineated on the printed sheets by the printer thus divide the sheet into a number of equi-spaced blocks more or less representing the proper positions of each printed page.

In the event the printed matter is out of square or does not match line for line on both sides of the sheet, the printer is enabled to determine the extent of error by means of the guide lines and to adjust the plates on the cylinder or bed accordingly for the correction of such error.

The best available equipment for the inspection of printed matter of this sort and for the delineation of the longitudinal and transverse guide lines on the printed sheet is, however, more or less make-shift and unquestionably inadequate.

The present invention has as its object, therefore, to provide an improved apparatus for supporting a printed sheet for inspection and for effecting the delineation of the longitudinal and transverse guide lines on the sheet.

More specifically, it is an object of the present invention to provide a line-up machine for printed sheets wherein the sheet is supported for inspection on the side wall of a cylinder and advanced in a circumferential path defined by the side wall of the cylinder past marking means which effect the delineation of longitudinal guide lines on the printed sheet as it travels in said path and which enable the transverse guide lines to be delineated on the sheet while the same is at rest on the cylinder.

Another object of this invention is to provide a line-up machine of the character described with a hollow sheet supporting cylinder at least one section of the side wall of which is capable of transmitting light rays therethrough from a source of light interiorly of the cylinder for projection through a printed sheet resting on said side wall to render printed matter on the underside of the sheet visible in silhouette to an operator of the machine.

A further object of this invention is to provide novel means for advancing a printed sheet in a circumferential path defined by the cylinder wall and for holding trailing portions of the sheet taut against the cylinder wall at least in a working zone convenient to an operator of the machine so as to facilitate inspection of the printed matter on the sheet.

Still another object of this invention is to provide means for rotating the sheet supporting cylinder of a line-up machine of the character described in either a forward or backward direction, and to provide a roller having friction means on its exterior for light frictional engagement with a sheet carried by the cylinder and traveling therewith to act as a drag on the sheet and thereby hold trailing portions thereof taut during forward rotation of the cylinder and to so drivingly connect the roller with the cylinder that the roller rotates with the cylinder only during backward rotation of the cylinder at a faster peripheral speed than that of the cylinder so that the sheet may be backed up for reinspection while held taut against the side wall of the cylinder during such retrograde motion of the sheet.

Another object of this invention is to provide novel brake means for stopping rotation of the cylinder and gripper release mechanism operable simultaneously by means common thereto.

A still further object of this invention is to provide a switch for disrupting energization of an electric motor drivingly connected with the sheet supporting cylinder to rotate the same which is actuated simultaneously with actuation of the brake for the cylinder and the gripper release.

Still another object of this invention is to provide a novel marker arrangement for a line-up machine of the character described which comprises a rotor or turret having a plurality of sets of markers thereon, any one set of which may be brought into the path of a printed sheet carried by the cylinder of the machine so as to delineate any selected set of spaced longitudinal lines on the printed sheet.

A further object of this invention is to provide a line-up machine of the character described with sets of markers mounted on a rotatable turret in cooperating relationship with a rotatable sheet supporting cylinder and to provide means for each set of markers for stopping rotation of the cylinder at any predetermined point to enable delineation of transverse lines on the printed sheet at predetermined positions of rotation of the cylinder.

A still further object of this invention resides in the provision of a line-up machine of the character described wherein a single set of markers suffices for the delineation of both longitudinal and transverse lines on a sheet carried by the sheet supporting cylinder of the machine.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 4 is a front elevation of the line-up machine shown in Figure 1;

Figure 5 is a sectional view taken through Figure 4 on the plane of the line 5—5;

Figure 6 is a perspective view more or less diagrammatically illustrating the manner in which release of the grippers and braking of the cylinder is simultaneously effected;

Figure 6a is a sectional view taken through Figure 5 on the plane of the line 6a—6a;

Figure 7 is a perspective view of a portion of the transverse marking mechanism illustrated in Figure 1;

Figure 8 is a sectional view taken through Figure 7 on the plane of the line 8—8;

Figure 9 is a cross sectional view taken through Figure 4 on the plane of the line 9—9;

Figure 10 is an exploded perspective view of one of the holders for the marking pencils showing the cooperative parts thereof in the proper order of their assembly;

Figure 11 is a perspective view of the light fixture which mounts inside the hollow cylinder of the machine;

Figure 12 is a perspective view of a portion of the friction roller showing the overrunning clutch thereon for drivingly connecting the same for rotation with the cylinder in one direction of cylinder rotation;

Figure 13 is a fragmentary sectional view taken through Figure 5 on the plane of the line 13—13 to more clearly illustrate the overrunning clutch for the friction roller;

Figure 19 is a view of a portion of a further modified type of machine having portions thereof shown in elevation and others shown in section;

Figure 20 is a view taken through Figure 19 on the plane of the line 20—20; and

Figure 2:
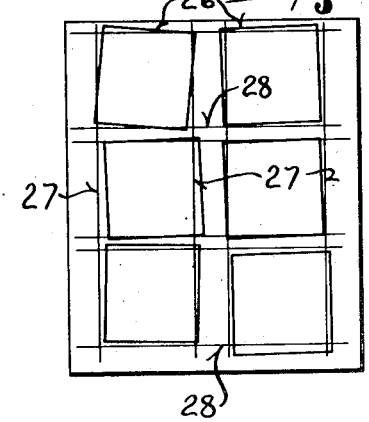
Figures 2 and 3 are diagrammatic views illustrating in exaggerated form printed matter which is improperly aligned on the sheet.

Referring now more particularly to the accompanying drawings in which like numerals indicate like parts, the numeral 25 (Fig. 2) designates a sheet having printed pages on one side thereof indicated by the misaligned rectangles 26 which are intended to represent the outlines of printed matter on the pages. It is to be understood that various different pages may be printed on one side of the sheet 25 as shown in Figure 2 with the sets of pages later adapted to be cut apart with transversely adjacent pages remaining connected to be later folded and bound in book or magazine form.

The printed sheet 25 with the misaligned printing thereon is intended to represent a trial sheet run immediately after the printer completes the "make ready" of the press by more or less rough adjustment of the individual plates for the various pages on the cylinder or bed of the press.

Heretofore the printed sheet with the misaligned printing was ruled off with a series of spaced, parallel longitudinal lines 27 and a series of spaced, parallel transverse lines 28 forming aligned blocks to properly indicate the desired boundaries of printed matter on each page printed on the sheet.

In the past these guide lines were drawn on the sheet by means of straight edges or T squares while the sheet was supported on a flat topped table. After comparison of the boundaries of the printed matter with these guide lines, the printer was able to make the required adjustment of the plates constituting the form necessary to effect printing of the pages within the desired blocked out areas of the sheet as indicated by the heavy lines 29 of Figure 3, which it is to be noted, are superimposed upon the longitudinal and transverse guide lines 27 and 28.

Figure 3:
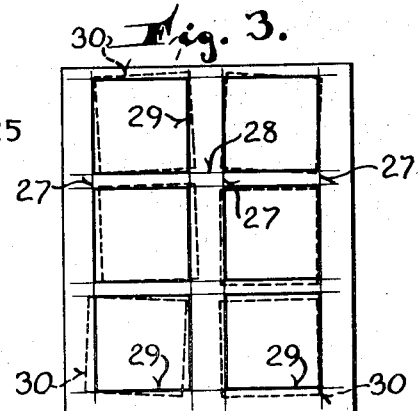

The sheet is next printed on its opposite side with the dotted lines 30 in Figure 3 representing such printed matter on each page at the underside of the sheet, and the adjustment of the plates repeated to bring the printed matter 30 into line for line and margin for margin alignment with the printing 29 on the front side of the sheet.

Inspection of the printing on the opposite side of the sheet has usually been effected by placing the sheet on a glass topped table and projecting light rays from a source of light beneath the table top through the sheet to render the printing visible in silhouette to an operator for comparison of the boundaries thereof with the guide lines 27 and 28.

Such inspection of the printing and the delineation of the longitudinal and transverse guide lines 27 and 28 on the sheet is facilitated and readily effected by means of the improved line-up machine of this invention indicated generally by the numeral 31.

This machine comprises a frame 32 having spaced uprights 33 between which a cylinder 34 is positioned to be supported by the uprights 33 for rotation on a substantially horizontal axis.

The cylinder is provided with a longitudinal recess 35 opening to its exterior and in which a number of longitudinally adjustable squaring devices 36 are mounted for engagement with the front edge of a printed sheet 37 placed on the cylinder to square the sheet with respect to the cylinder axis.

A plurality of grippers in the form of spring fingers 38 are secured at one end thereof to the wall of the cylinder as at 39, with their free ends 40 extending across the recess 35 to overlie the cylinder wall at the edge of the recess at which the squaring devices 36 are located.

Figure 1:
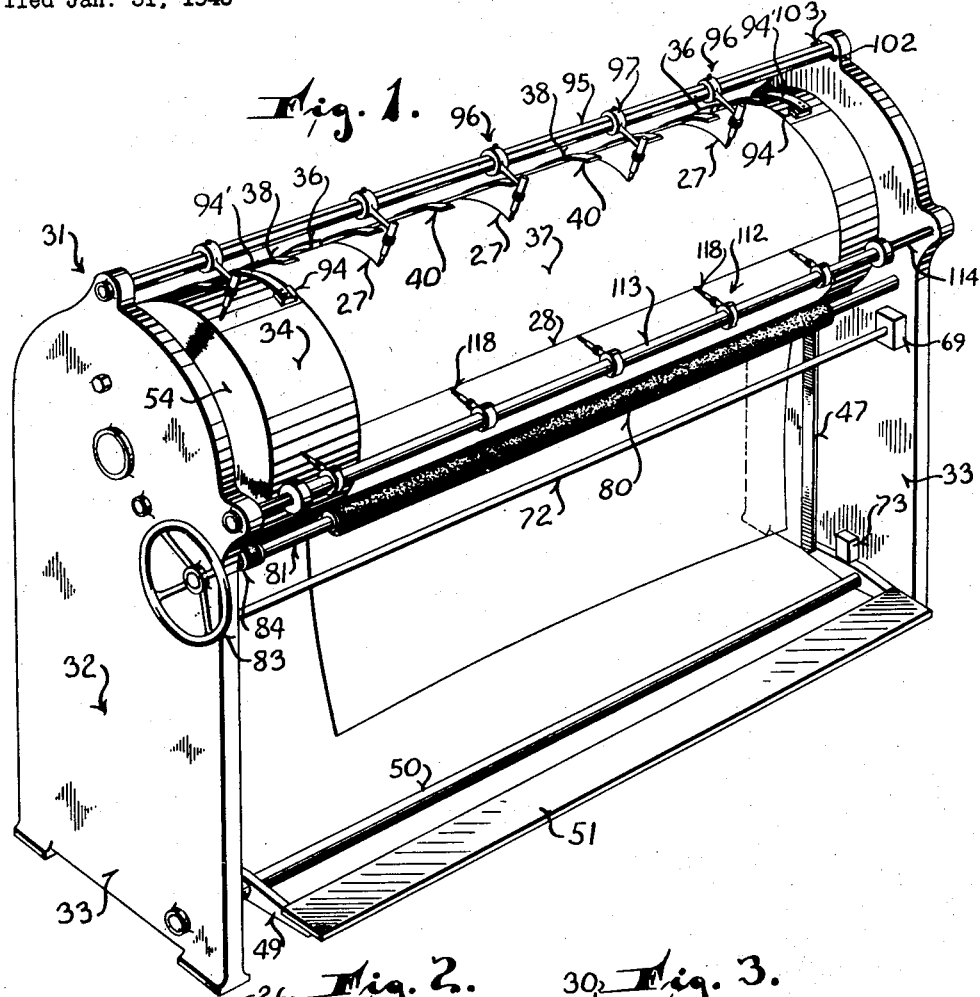
Figure 1 is a perspective view of the line-up machine of this invention showing a printed sheet in position for inspection and the delineation of longitudinal and transverse guide lines thereon.

The free ends 40 of the spring fingers are yieldingly urged against the adjacent side wall of the cylinder to clamp a sheet placed on the cylinder with its front edge against the squaring devices 36 to the cylinder wall with a spring tension so that the sheet travels with the cylinder during rotation of the cylinder with trailing portions of the sheet assuming the shape of and resting on the side wall of the cylinder as clearly shown in Figure 1.

Figure 6A:
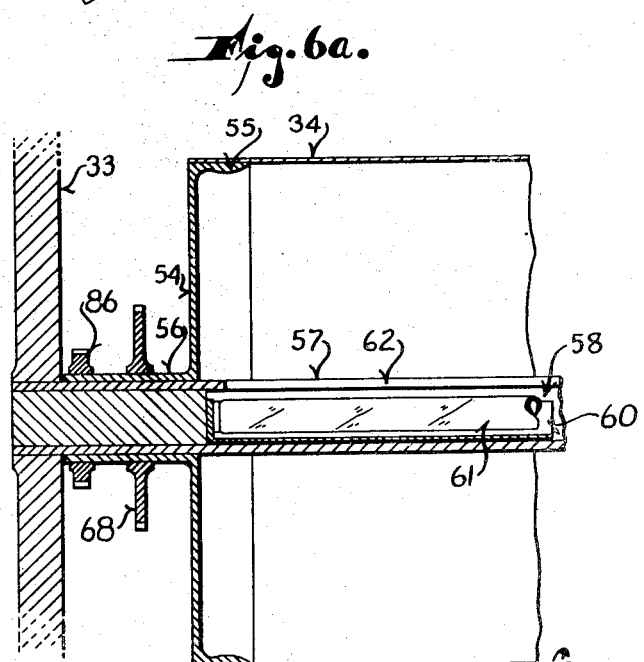

The grippers are simultaneosuly released from their operative positions clamping a printed sheet to the cylinder by means of ecccentrics 41 shown in Figures 5 and 6 fixed on a common shaft 42 extending longitudinally of the cylinder within the recess 35 and oscillatably received in bearings 43 projecting from one side wall of the recess so that oscillation of the shaft 42 in a direction to force the spring fingers outwardly away from the wall of the cylinder releases a sheet clamped thereby.

Such release of a printed sheet is readily effected when the cylinder is in or is approaching a position such as shown in Figure 5, where the recess 35 is uppermost and at which cam followers 44 rotatably journalled on the free ends of levers 45 fixed to the shaft 42 between the ends of the cylinder and the adjacent uprights 33 are in a position to be acted upon by cam segments 46. The cams 46 are carried for vertical gripper controlling movement at the uper ends of links 47 slidingly received in guides 48 projecting inwardly from the adjacent uprights 33.

The lower ends of the links 47 are attached to the inner ends of levers 49 medially pivoted on a transverse shaft 50 extending across the lower portion of the machine and having its opposite ends fixed in the spaced uprights 33.

The outer arms of these levers are connected by a treadle 51 accessible to the operator at the front of the machine so that the mere act of depression of the treadle when the cylinder approaches or is in its Figure 5 position of rotation acts to release the grippers so that a printed sheet may be readily "loaded" onto or removed from the cylinder.

Attention is directed to the fact that the cylinder 34 is of hollow construction in that is comprises a circumferential side wall 53 formed of glass or plastic or any other suitable transparent or translucent material capable of transmitting light rays therethrough. This cylindrical shell is closed by end walls 54 which have cylindrical flanges 55 projecting into the interior of the cylindrical shell 53 to receive the same thereon.

Hollow cylindrical hubs 56 project from the end closures 54 and rotatably receive a tubular mounting member 57 therein the opposite ends of which are fixed in the adjacent uprights 33 so that the cylinder is free to rotate on the tube 57.

The cylinder shaft 57 is of tubular construction for the purpose of housing a fluorescent lighting fixture generally designated 58. A knob 59 at one end of the light fixture 58 exposed at the exterior of one of the uprights 33 enables the fixture to be withdrawn from or inserted inside the tube 57.

The lighting fixture 58 includes a reflector 60 surrounding approximately three sides of the fluorescent tube 61 with the open side of the reflector facing forwardly and upwardly so that the reflector directs light rays through a longitudinal slot 62 cut in the tube 57 for the illumination of the working zone at the front top sector of the cylinder and for projection through a sheet resting thereon to render printing on the underside of the sheet visible in silhouette to an operator of the machine.

The cylinder with a sheet held thereon by the grippers is adapted to be driven by a reversible electric motor 65 with which it is connected as by means of a chain 66 trained over sprockets 67 and 68 fixed on the motor shaft and the hub 56 of one of the end closures 54 for the cylinder respectively.

Figure 14:
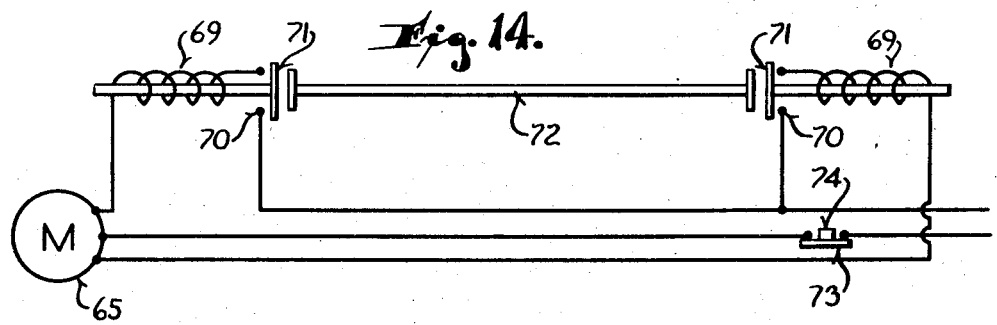
Figure 14 is a wiring diagram showing the energizing circuits for the reversible electric motor which drives the cylinder of the machine.

Referring to the wiring diagram illustrated in Figure 14, it will be seen that there are two energizing circuits for the motor, each of which includes an electromagnetic switch 69 having its coil and contacts connected in series with the motor windings. These switches include stationary contacts 70 and movable contactors 71 carried by the switch armatures and adapted to bridge the stationary contacts of their respective switches to complete an energizing circuit to the motor and through the solenoid to hold the same energized for continued operation of the motor.

The electromagnetic switches are mounted on the uprights 33 adjacent to the opposite ends of an actuator rod 72 extending across the front of the machine and having its ends received in the uprights 33 for axial sliding motion lengthwise of the cylinder.

Thus, it will be seen that axial motion of the rod 72 in either direction effects bridging of one set or the other of the stationary contacts 70 to effect operation of the motor in either a forward or reverse direction.

A normally closed push button type switch 73 common to both energizing circuits for the motor is provided to effect deenergization of the motor when it is desired to stop rotation of the cylinder. This switch 73 is located on one of the uprights 33 so that its actuator 74 is in a position to be engaged by the inner arm of the adjacent medially pivoted lever 49 of the treadle arrangement so that the switch 73 is opened when the operator depresses the treadle to effect release of the grippers. Gripper release, is therefore, effected substantially simultaneously with deenergization of the electric motor.

Depression of the treadle 51 also carries brake shoes 75 mounted on the links 47 into engagement with the hollow hubs 56 of the cylinder closures 54 to immediately slow down and stop the cylinder upon deenergization of the drive motor and release of the grippers.

As clearly shown in Figure 6, each of the brake shoes 75 is medially pivoted as at 76 on the free end of a link 77 with the opposite end of the link being pivotally connected as at 78 to its link 47.

Substantially heavy tension springs 79 connected between the links 47 and 77 yieldingly hold the brake shoes adjacent to the exteriors of the hollow hubs 56 and the application of brake pressure onto the cylinder is therefore effected through these springs.

In order that a printed sheet secured to the cylinder for rotation therewith may have its trailing edge portions stretched substantially tight over the cylinder wall at least in the working zone of the machine a "plush" roll 80 is provided for light frictional engagement with the trailing portions of a sheet advancing in its circumferential path around the cylinder wall.

This plush roll is carried by a shaft 81 extending across the front of the machine slightly below the horizontal axis of the cylinder 34 and rotatably received in suitable bearings in the uprights 33 so that the roller is free to rotate on a horizontal axis parallel to the cylinder axis with the nap at the periphery of the roller 80 closely adjacent to the periphery of the cylinder and bearing lightly against a sheet on the cylinder.

If desired, a brush type of roller may be employed for the same purpose, but in either event, it is to be noted that the end of the shaft 81 at the gear side of the machine is rotatably received in a tube 82 which in turn is rotatably journalled in the adjacent upright 33. A hand wheel 83 is mounted on the extremity of the tube 82 at the outer side of the upright 33 so that rotation may be manually imparted to a V-pulley 84 loose on the shaft 81 but fixed to the tube for rotation therewith. This pulley forms part of an overrunning clutch 85 which drivingly connects the "plush" roll for rotation with the cylinder in only one direction of cylinder rotation in a manner now about to be described.

Referring particularly to Figure 5, it will be seen that the hub 56, in addition to the sprocket 68, has a gear 86 fixed thereon which meshes with a pinion 87 fixed on a stub shaft 88 rotatably carried by the adjacent upright 33 at a location substantially between the axis of the cylinder and the shaft 81. Also fixed on the stub shaft 88 is a V-pulley 89 which is drivingly connected with the pulley 84 by a V-belt 90 trained thereover.

The pulley 84, however, as previously stated forms part of the clutch 85 whereby the plush roller 80 rotates with the cylinder in only one direction of cylinder rotation while rotation of the cylinder in the opposite direction is carried out with the plush roll stationary or dragging.

As clearly shown in Figures 12 and 13 it will be seen that the pulley 84 has a pair of diametrically opposite recesses 91 in its bore, the bottom walls of which progressively recede from points of tangency with the shaft toward abrupt radial shoulders 92 on the pulley.

Pins 93 disposed in the deepest portions of the recess as shown in Figure 12 adjacent to the shoulders 92 permit the pulley to be rotated in a clockwise direction as viewed in Figure 5 without effecting similar rotation of the shaft 81 and the plush roll. The pins 93, however, become wedged in the narrowing portions of the recesses upon rotation of the pulley in a counterclockwise direction to cause rotation of the pulley and plush roller as a unit in said clockwise direction.

Such rotation of the pulley may be effected either by means of the hand wheel 83 which by reason of the gear connections 86 and 87 effects a corresponding rotation of the cylinder 34, or by means of the electric motor 65 which is connected to the cylinder by means of the chain drive 66.

Because of the overrunning clutch it will be seen that when the cylinder 34 is rotated in a forward direction, counterclockwise as viewed in Figure 5, to advance a printed sheet with its trailing edge confined between the cylinder wall and the plush roller 80, the overrunning clutch is inoperative to effect a corresponding rotation of the plush roller so that the same acts as a drag on the trailing portions of the sheet and holds such portions of the sheet between it and the grippers stretched taut about the circumferential wall of the cylinder in which condition inspection of printed matter on one or both sides of the sheet is facilitated. It is to be understood, of course, that the plush roll is free to rotate clockwise whenever the cylinder is rotating counterclockwise, but the light contact between the rotating cylinder and the nap on the plush roll does not afford sufficient frictional engagement between the cylinder and roll to completely overcome the inertia of the roll and establish a positive rotation transmitting connection between these elements. Although the plush roll may rotate somewhat because of its light engagement with the cylinder, there will always be sufficient slippage to enable the roll to act as a drag on the trailing edge of a sheet on the cylinder.

In the event of backward rotation of the cylinder, clockwise as viewed in Figure 5, for reinspection of any portions of the printed sheet the overrunning clutch at this time becomes operative to effect rotation of the plush roller in unison with the cylinder. Thus, while the cylinder rotates in a clockwise direction during reinspection of the printed sheet the plush roller will be caused to rotate in a counterclockwise direction so that its periphery moves in the same direction as the periphery of the cylinder adjacent thereto. The gear reduction in the driving connection between the roller and the cylinder, however, causes the plush roller to rotate with a higher peripheral speed than that of the cylinder, so that the friction material with which the plush roller is covered and which lightly engages the surface of the printed sheet tends to stretch the sheet and thereby effects the desired condition of holding the sheet taut on the cylinder wall in the working zone during retrograde rotation of the cylinder.

While the apparatus thus far described is capable of satisfactorily presenting printed sheets for inspection of the printed matter thereon, it is also another purpose of this invention to provide means on the machine whereby the transverse and longitudinal lines 27 and 28 may be delineated on the sheet with any desired spacing thereof so as to enable alignment of the outlines of printed matter on one or both sides of the sheet with said delineated lines.

For this purpose the machine is provided with a cross shaft 95 extending above the cylinder 34 on an axis parallel to the axis of the cylinder and having its ends rotatably received in the opposite uprights 33. The shaft shown in the drawings is hexagonal in cross section although other shapes may be provided.

Slidably but non-rotatably mounted upon the hexagonal shaft 95 are a number of markers 96. Each marker comprises a hub 97 having a hexagonal bore to slidably receive the shaft, a substantially radial forwardly projecting arm 98 overlying the surface of the cylinder as shown, and a holder 99 on the extremity of the arm disposed substantially at right angles thereto so as to hold a pencil 100 or other similar marking device in engagement with the printed sheet on the cylinder 34.

The markers 96 are adapted to be adjustably locked on the shaft 95 with any desired axial spacing therebetween by means of set screws 101 threaded into the hubs 97 of the markers and engaging one of the flat sides of the hexagonal portion of the shaft as shown in Figure 9. These markers may be moved as a unit from an inoperative position shown in dotted lines in Figure 5 to an operative position engaging the printed sheet, as shown in full lines, merely by rotation of the shaft 95 through an arc of slightly more than 90°. A pin 102 projecting radially from the shaft 95 engages with a stud 103 projecting inwardly from the adjacent upright 33 to define the inoperative position of the markers.

Inasmuch as the markers are fixed axially on the shaft in any predetermined positions they effect the delineation of the proper longitudinal lines 27 on the printed sheet as long as the sheet is squared by the squaring devices 36 and has one or the other of its side edges engaged with the face 94 of one of a pair of side register devices 94' longitudinally adjustably carried by the supporting structure for the squaring devices 36 near the ends of the cylinder.

The holders 99 for the pencils are of special construction in that they comprise a socket portion 104 in which is confined a compression spring 105. A hollow plunger 106 receives the pencil 100 and is slidable within the socket portion 104 but normally maintained in an outwardly projecting position by means of the spring 105. A cap 107 is threaded on the one open end of the socket and this cap retains a washer 108 in position at the end of the socket with a tongue 109 on the washer projecting radially from its inner periphery into a longitudinal recess 110 on the outer wall of the plunger 106.

This recess extends from the outermost end of the plunger to a point close to the inner end thereof which is received inside the socket 104. The washer 108 thereby limits projection of the plunger out of the socket and at the same time permits the pencil to be yieldingly urged toward the side wall of the cylinder and against a printed sheet thereon for the delineation of longitudinal lines on the sheet.

Near its outer extremity the recess 110 of the plunger has a laterally extending branch 111 leading therefrom to form in effect a bayonet slot by which the plunger may be depressed into the socket 104 and locked therein by the engagement of the tongue of the washer in said branch. The pencils 100 are thus easily locked in an inoperative or retracted position.

The transverse lines are delineated upon the printed sheet by means of a similar arrangement of markers 112 axially adjustably fixed on a tube 113 which is slidably received on a hexagonal shaft 114. The shaft 114, as will be obvious, may be round and have the tube 111 splined or keyed thereto, but in any event it has its ends rounded and rotatably received in the uprights 33.

In the present case each end of the tube 113 is received in a counterbore 115 formed in a collar 116 and the collars are fixed on the tube by means of set screws 117. The collars 116 have hexagonal bores to slidably non-rotatably receive the shaft 114.

All of the markers 112 have holders for the pencils 118 similar to those previously described and which permit the pencils to be retracted to inoperative positions in the manner previously described.

During examination of a printed sheet on the cylinder, at which time the longitudinal lines 27 may be delineated thereon, the markers 118 are preferably maintained in their retracted positions to be released when the printed sheet is at rest on the cylinder in a position at which it is desired to effect delineation of the transverse lines 28 on the sheet.

When the plungers are released for projection of the pencils 118 against the printed sheet on the cylinder, the tube 113 is moved axially or endwise by the operator of the machine and the pencils trace the desired transverse lines 28 on the sheet.

Figure 21:
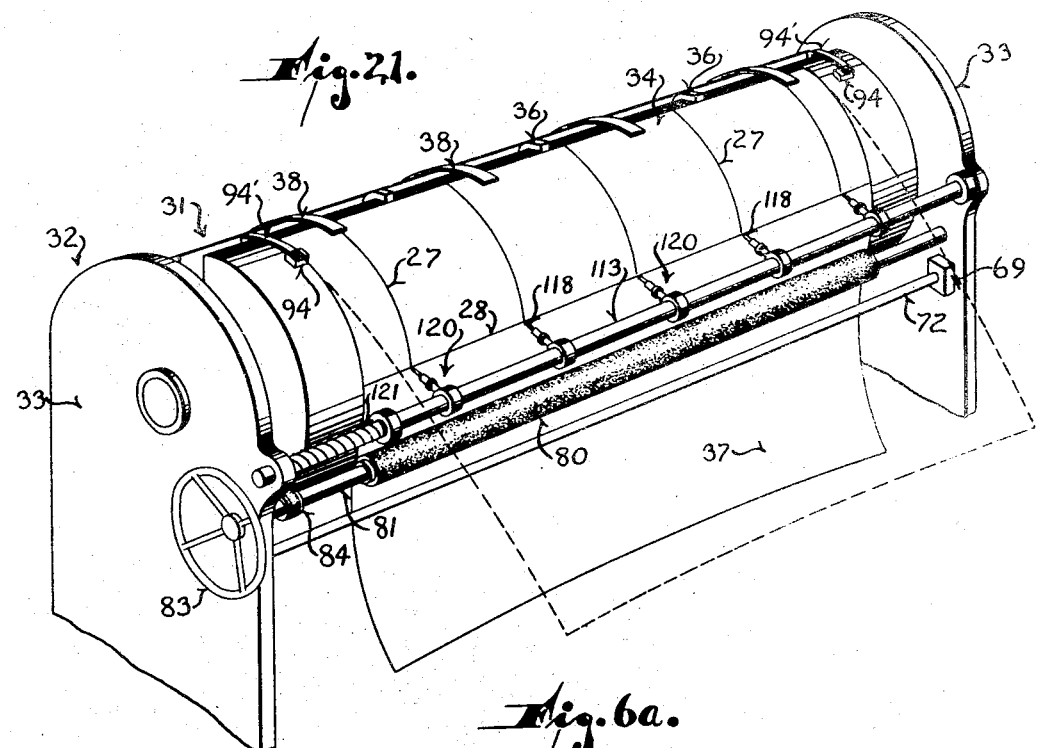
Figure 21 is a perspective view similar to Figure 1 illustrating another modified embodiment of this invention.

If desired, both the longitudinal and transverse lines may be delineated on the printed sheet by means of a single set of markers 120 such as illustrated in Figure 21 mounted at the front of the cylinder 34 slightly below the axis thereof and in a similar manner to that of the markers 112.

In this case, however, one of the collars 116 acts as a stop and cooperates with the upright 33 adjacent thereto to limit axial motion of the tube 113 in response to the action of a compression spring 121 confined between the other collar 116 and its adjacent upright 33. Hence, the marker assembly is at all times maintained to the right as viewed from the front of the machine with the pencils 118 projected and engaged with a printed sheet carried about the cylinder for delineating the longitudinal lines 27 thereon. Upon stopping of cylinder rotation at any desired position, the transverse lines 28 are readily delineated upon the printed sheet upon axial sliding of the tube 113 with the markers thereon to the left against the action of the spring 121.

In all other respects the line-up machine of Figure 21 is substantially the same as that hereinbefore described.

For certain types of repetitive work where a number of different pages are printed on both sides of a sheet and where different sets of longitudinal lines are repeatedly required, it is sometimes desirable to employ markers for delineating the longitudinal lines on the printed sheets with the markers mounted in sets 125 on a rotor or turret 126 carried on a cross shaft 127 slightly above the cylinder 34 but on an axis parallel to the cylinder axis.

This shaft, as will be apparent, is rotatably received by the opposite uprights 33, and has an extension 128 projecting outwardly beyond one of the uprights as shown in Figure 19. A hand wheel 129 on the outer extremity of the extension provides for rotating the turret so that any set of markers thereon may be presented to the printed sheets.

The turret comprises a hub member 130 fixed on the shaft 127 between the uprights 33 and substantially equal in length to the length of the cylinder. A number of radially projecting arms 131 extend longitudinally the full length of the hub 130 and have grooves 132 cut into one face thereof to receive two-piece clamp elements 133 thereon with tongues 134 on the clamp elements engaging in the grooves 132 to slidably mount and guide the markers 135 on the clamps for longitudinal movement along the arms. The markers are locked in any desired longitudinal position on their respective arms by means of screws 136 passing through one of the clamping sections and threading into the other to hold the sections with the arms therebetween.

In the present instance there are six sets of markers shown on the turret 126 to enable the delineation of longitudinal guide lines on printed sheets wherein six different types of printed matter appear on the sheets and where each requires a different set of spaced guide lines.

A hand screw 137 threaded down through the top of one of the uprights 33 and engaging the shaft 127 may be employed to lock the rotor in a position engaging any one of its sets of markers with the printed sheet.

In this embodiment of the invention it is also desirable to mount a drum 140 on the cylinder shaft or support 141 beneath the extension 128 of the turret shaft. The drum is provided with a number of axially spaced annular ribs 142 on its exterior having circumferential track forming grooves 143 cut into one side thereof to adjustably receive a number of circumferential stops 144 which may be secured in position on the ribs by means of set screws 145.

The number of ribs on the drum correspond to the number of sets of markers on the turret and any set of circumferential stops 144 on the ribs of the drum is selectively engageable with a pawl 146 axially slidable on the extension 128 of the turret shaft.

Thus, rotation of the cylinder may be stopped at predetermined positions of rotation thereof by the pawl where the transverse guide lines are required to be delineated on the sheet by reason of successive engagement of the stops 144 on any one rib therewith on which the pawl 146 is set to ride.

Obviously, after each interruption the pawl must be manually disengaged from the stop engaged therewith to enable further rotation of the cylinder for continued advance of the sheet.

Each time the turret is rotated to bring a different set of markers to bear upon a printed sheet, the pawl 146 is manually moved axially to ride on the rib 142 having the proper set of circumferential stops.

With the pawl 146 lifted out of engagement with the ribs 142, the cylinder 34 may be motor driven in the manner hereinbefore described to enable longitudinal lines to be delineated on a sheet traveling with the cylinder. When the pawl is used to locate the transverse lines, however, the cylinder must be manually rotated.

Figure 15:
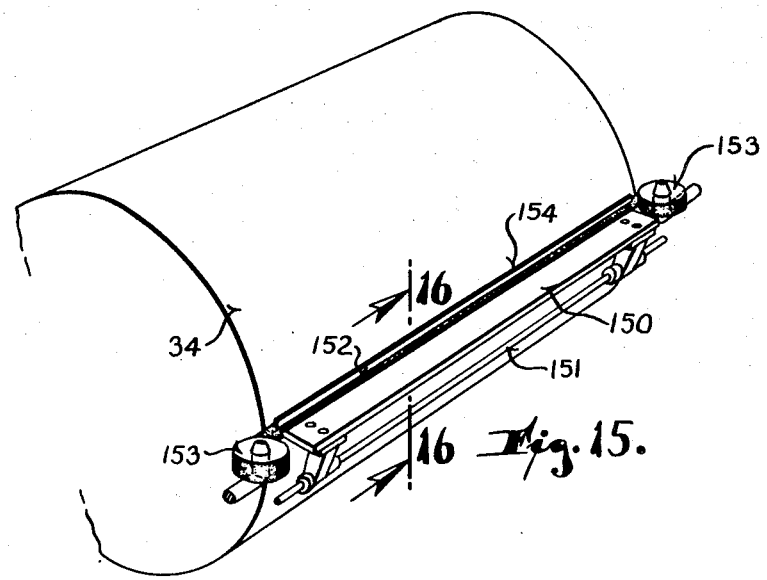
Figure 15 is a fragmentary perspective view of a sheet supporting cylinder having a modified type of marker for the delineation of transverse lines on the printed sheets.
Figure 16:
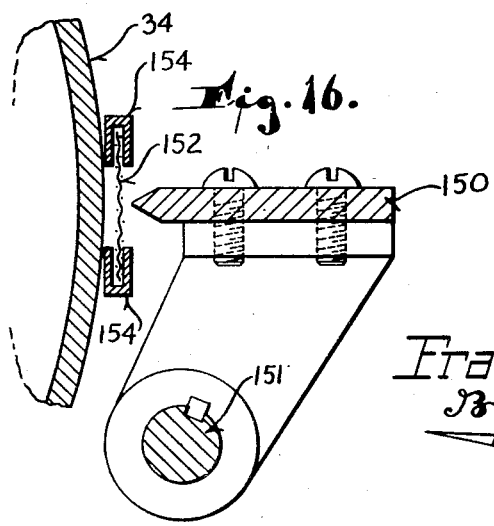
Figure 16 is a cross sectional view taken through Figure 15 on the plane of the line 16—16.

In the modification shown in Figure 15, the transverse lines are adapted to be delineated upon the printed sheet by means of a horizontal blade 150 supported by a cross shaft 151 for movement of the blade toward and from the adjacent side of the cylinder 34.

An inked ribbon 152 supported by spools 153 at the opposite ends of the cylinder 34 and trained between guides 154 so as to lie between the edge of the blade and a sheet on the cylinder is adapted to be impressed against the sheet by the blade upon oscillation of the shaft 151 to carry the edge of the blade toward the side of the cylinder.

Figure 17:
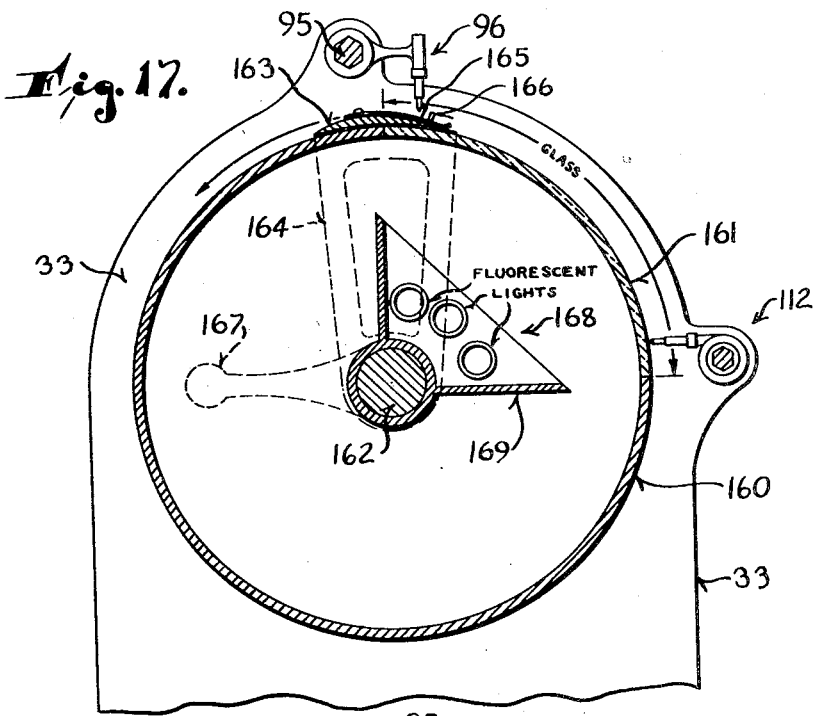
Figure 17 is a cross sectional view through the cylinder of a modified type of line-up machine.

While the circumferential side wall of the cylinder 34 has been previously described as being made of glass or any other suitable transparent or translucent material it is also possible to form the cylinder wall of metal as at 160 in Figure 17 with a section thereof in the working zone formed of glass 161 or other transparent or translucent material to permit the projection of light rays therethrough from a source interiorly of the cylinder.

In this instance, the cylinder is stationarily mounted between the uprights 33 on a shaft 162 the ends of which are fixed in the opposite uprights 33.

In order that a printed sheet may be carried around the stationary cylinder, a cross bar 163 is provided extending the full longitudinal dimension of the cylinder close to its exterior and having arms 164 extending radially inwardly to be rotatably received on the shaft 162. The cross bar 163 mounts spring fingers 165 which act as grippers to hold a printed sheet by the forward edge thereof onto the cross bar, and has spaced projections 166 near the free ends of the grippers for squaring of the sheet in a manner similar to that previously described. The cross bar is conveniently rotated by means of a crank 167 connected with one of the arms 164 exteriorly of the adjacent upright 33.

Mounted on the shaft 162 inside the hollow cylinder of a bank of fluorescent lights 168 having a reflector 169 for directing light rays therefrom through the glass section 161 of the cylinder provides a source of light so that printed matter on the underside of a sheet resting on said section 161 of the cylinder may be rendered visible in silhouette to an operator of the machine.

Figure 18:
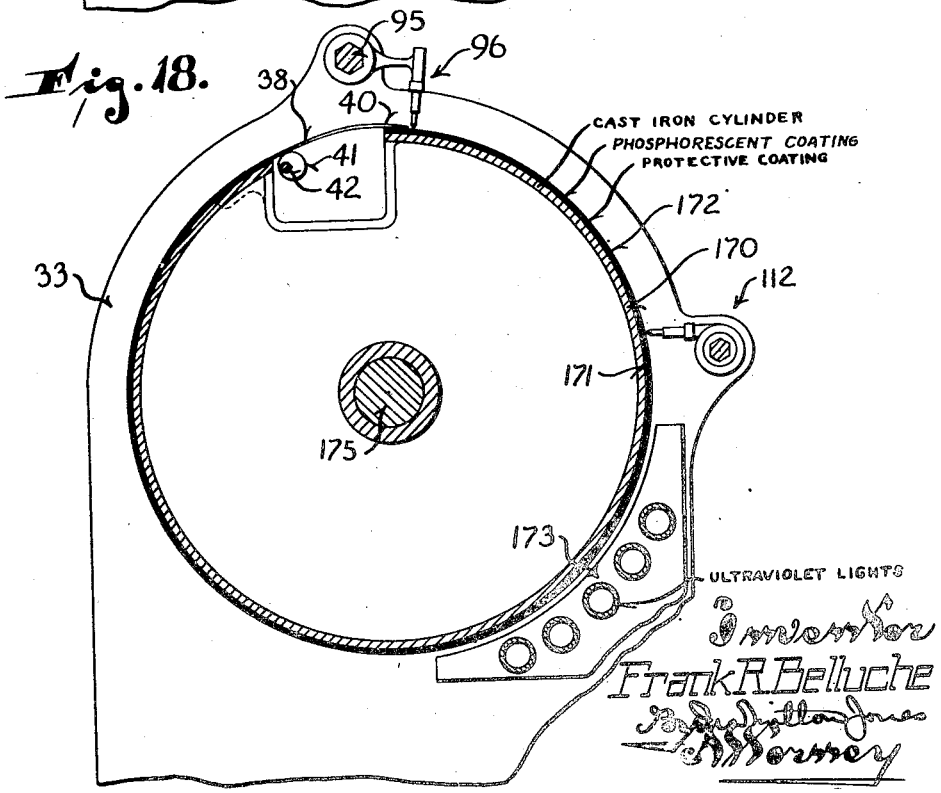
Figure 18 is a cross sectional view similar to Figure 17 illustrating another type of sheet supporting cylinder.

In Figure 18 another means for rendering printed matter on the underside of a printed sheet visible in silhouette is illustrated. As here shown, the cylinder is provided with a metal side wall 170 the exterior of which is coated with a phosphorescent material 171 over which a protective coating 172 such as cellophane or clear varnish or shellac is applied.

A bank of ultraviolet lights 173 adjacent to the cylinder immediately below the working zone defined by the spaces between the two sets of markers provides for excitation of the phosphorescent coating so that the same emits light rays for transmission through a printed sheet resting on the cylinder in the working zone to render printed matter on the underside of the sheet visible in silhouette to an operator of the machine.

The cylinder in this instance is supported on a shaft 175 for rotation about the shaft axis and is provided with grippers and registering devices similar to those of the Figure 1 embodiment of the invention.

From the foregoing description taken in connection with the accompanying drawings, it will be readily apparent to those skilled in the art that the process of aligning and centering printing matter on a cylinder is materially simplified and facilitated through the line-up machine of this invention.

What I claim as my invention is:

1. In a line-up machine of the character described, the combination of: a frame including spaced uprights; a cylinder rotatably mounted on the frame between said uprights; means for rotating the cylinder either forwardly or backwardly; grippers on the cylinder for clamping the front edge of a printed sheet to the exterior of the cylinder so that the printed sheet follows the cylinder during forward rotation thereof to enable inspection of printed matter on that portion of the sheet which rests on the cylinder; a roller rotatably carried by said supports so as to extend longitudinally of the cylinder adjacent to its side wall; friction means on the roller having light frictional engagement with the trailing portions of a sheet on the cylinder; and a unidirectional driving connection between the cylinder and roller whereby the cylinder rotates relatively to the roller upon forward rotation of the cylinder so that trailing portions of a sheet resting on and advancing with the cylinder are held taut against the sides of the cylinder, said driving connection including means for rotating the roller with the cylinder but with a greater peripheral speed than that of the cylinder upon backward rotation of the cylinder for reinspection of a printed sheet so that the roller holds the portions of the sheet resting on the cylinder taut during such reinspection of the sheet.

2. In a line-up machine of the character described: a frame including spaced uprights; a cylinder carried by the frame between said uprights; means for advancing a sheet by its front edge along a circumferential path defined by the side wall of the cylinder and through a fixed working zone near the upper portion of the cylinder with a substantial area of the trailing portion of the sheet resting on the cylinder in said working zone to enable inspection of printed material on the sheet; means carried by the frame alongside the cylinder but near the lower extremity of said working zone having friction means thereon adapted to lightly engage the trailing portions of a sheet advancing through said working zone to act as a drag thereon and to thereby hold the trailing portion of the sheet taut against the side of the cylinder in said working zone; and marking means supported by the frame and disposed in said working zone so as to lie in the path of travel of a printed sheet advancing therethrough for delineating lines on a sheet either while the sheet is moving or while the sheet is at rest on the cylinder.

3. In a line-up machine of the character described: a frame including spaced uprights; a cylinder positioned between said uprights and rotatably supported thereby; grippers on the cylinder for detachably securing a printed sheet to the cylinder for rotation therewith with portions of the sheet disposed about and supported on the circumferential side wall of the cylinder; a reversible electric motor drivingly connected with the cylinder for rotating the same in opposite directions; a rod extending between said supports and journalled thereby for endwise motion longitudinally of the cylinder; a switch carried by each upright with the switches adjacent to the ends of the rod to be selectively closed thereby upon axial movement of the rod; separate energizing circuits for the motor each including one of said switches for effecting operation of the motor in forward and reverse directions depending upon the direction of end-wise actuation of said rod to close one of said switches; and a switch common to both circuits for effecting de-energization of the electric motor regardless of its direction of rotation.

4. In a line-up machine of the character described: a rotatable cylinder for supporting a printed sheet on the cylindrical side wall thereof; means on the cylinder for squaring and securing a sheet to the cylinder for travel therewith upon rotation of the cylinder so as to enable inspection of printed matter on the sheet; a reversible electric motor for driving the cylinder in opposite directions of rotation; separate energizing circuits for the electric motor for effecting operation thereof in opposite directions; separate switches for closing said circuits; a normally closed switch common to both circuits for deenergizing the electric motor regardless of its direction of rotation; means for actuating said switch to open the same; a brake for stopping rotation of the cylinder upon deenergization of the motor; and a connection between the brake and said switch actuating means by which the brake is applied substantially simultaneously with opening of said normally closed switch by the actuating means to quickly bring the cylinder to a stop upon deenergization of the motor.

5. In a line-up machine of the character described: a frame including spaced uprights; a cylinder positioned between said uprights and supported thereby for rotation about a fixed axis; grippers carried by the cylinder having sheet engaging portions yieldingly urged against the side wall of the cylinder to clamp the edge portion of a sheet inserted thereunder to the cylinder so that the sheet travels with the cylinder during rotation thereof; eccentric means carried by the cylinder adjacent to the grippers for oscillatory movement toward and from the grippers and engageable therewith to carry said end portions of the grippers away from the side of the cylinder to effect release of a sheet clamped thereby; a reversible electric motor for driving the cylinder in opposite directions; separate energizing circuits for the electric motor each including a switch operable upon closure to effect energization of one of said circuits; a normally closed switch common to both of said circuits for disrupting either of said circuits and thereby effect deenergization of the electric motor; a brake for the cylinder to stop rotation thereof; and an operating lever carried by the frame for actuating the eccentric means and the brake and for substantially simultaneously opening said normally closed switch upon operation of the lever so as to effect deenergization of the electric motor and substantially simultaneous braking of the cylinder and release of the grippers.

6. In a line-up machine of the character described: a frame including spaced uprights; a cylinder positioned between said uprights and rotatably supported thereby; grippers on the cylinder engageable with an end portion of a printed sheet placed upon the cylinder to clamp the same to the side wall of the cylinder so that the sheet travels with the cylinder during rotation thereof with trailing portions of the sheet resting on and assuming the shape of the cylinder wall; a shaft rotatably carried by said uprights with its axis parallel to the cylinder axis but with the shaft spaced a distance from the side wall of the cylinder; a plurality of sets of markers fixed on said shaft for rotation therewith, each set comprising a number of marking elements angularly aligned with respect to each other but angularly offset with respect to an adjacent set of markers with the markers of each set adjustably fixed in predetermined longitudinally spaced relationship with respect to the shaft and having their marking elements arranged so that any set of markers on the shaft may be brought into cooperating relationship with the cylinder into positions lying in the path of a printed sheet traveling with the cylinder so as to delineate longitudinal lines on said sheet as the same is advanced past the markers; a drum rotatable with the cylinder; circumferentially spaced stops on the drum for each set of markers axially spaced from the stops for another set of markers; a pawl axially slidable on the shaft adjacent to the drum for engagement with the stops of any set thereof so as to halt rotation of the cylinder at predetermined positions depending upon the angular disposition of the circumferential stops of any set thereof; and other marking means supported by the frame for motion transversely of a sheet at rest on the cylinder for delineating transverse lines on said sheet upon such stopping of the cylinder so that said transverse lines are delineated at locations on the sheet determined by the angular positions of the stops.

7. In a line-up machine of the character described: a frame including spaced uprights; a cylinder journalled on the frame between said uprights for forward and backward rotation on a fixed horizontal axis; grippers carried by the cylinder for clamping one longitudinally disposed edge of a printed sheet placed on the cylinder to the side wall of the cylinder so that the sheet travels forwardly with the cylinder with trailing portions of the sheet resting on and disposed about the side wall of the cylinder; a roller rotatably carried by the frame and extending longitudinally along the side wall of the cylinder, said roller having friction means thereon lightly engageable with trailing portions of a sheet traveling forwardly with the cylinder to act as a drag on the sheet and to thereby hold said trailing portions of the sheet taut against the side walls of the cylinder; a rotation transmitting connection between the cylinder and the roller operable only during backward rotation of the cylinder, for rotating the roller in a direction counter to the direction of cylinder rotation and with a greater peripheral speed than that of the cylinder; and marking means carried by the frame adjacent to the side wall of the cylinder to enable guide lines to be delineated on a sheet supported on the cylinder either while the sheet is moving or while the sheet is at rest on the cylinder.

8. In a line-up machine of the character described: a frame including spaced supports; a member carried by the frame between said supports having a cylindrical surface portion; means for advancing a sheet by its front edge along a path defined by the cylindrical surface portion of said member and through a fixed working zone comprising a portion of the path through which the sheet is advanced to enable inspection of printed material on the sheet; means carried by the frame alongside the cylindrical surface portion of said member at one side of said working zone having friction means thereon adapted to lightly engage portions of a sheet advancing through said working zone to act as a drag thereon and to thereby hold the portion of the sheet advancing through the working zone taut against the cylindrical surface of the member; and marking means supported by the frame and disposed in said working zone so as to lie in the path of travel of a printed sheet advancing therethrough for delineating lines on a sheet either while the sheet is moving or while the sheet is at rest on the cylindrical surface of the member.

9. The line-up machine described in claim 2 further characterized by a coating of phosphorescent material on the side wall of the cylinder; and means for exciting said coating to phosphorescence so that printed matter on the underside of a sheet on said wall is visible in silhouette to an operator of the machine for inspection thereof.

10. The line-up machine described in claim 7 further characterized by a coating of phosphorescent material on the side wall of the cylinder; and means for exciting said coating to phosphorescence so that printed matter on the underside of a sheet on said wall is visible in silhouette to an operator of the machine for inspection thereof.

11. The line-up machine described in claim 8 further characterized by a coating of phosphorescent material on the cylindrical surface portion of said member; and means for exciting said coating to phosphorescence so that printed matter on the underside of a sheet on said cylindrical surface is visible in silhouette to an operator of the machine for inspection thereof.

FRANK R. BELLUCHE.

REFERENCES CITED

The following references are of record in the file of this patent:

UNITED STATES PATENTS

| Number | Name | Date |
|---|---|---|
| 638,237 | Grosse | Dec. 5, 1899 |
| 676,943 | Flora | June 25, 1901 |
| 845,234 | Hays | Feb. 26, 1907 |
| 1,368,926 | Hansen | Feb. 15, 1921 |
| 1,433,453 | Guerrero | Oct. 24, 1922 |
| 1,543,991 | De Pamphelis | June 30, 1925 |
| 1,671,343 | Carroll | May 29, 1928 |
| 1,832,255 | Springstead | Nov. 17, 1931 |
| 2,164,548 | Smoot | July 4, 1939 |
| 2,249,245 | Hofrichter | July 15, 1941 |
| 2,279,338 | Oldham | Apr. 14, 1942 |

FOREIGN PATENTS

| Number | Country | Date |
|---|---|---|
| 854,467 | France | Jan. 19, 1940 |